United States Patent
Warkentin et al.

(10) Patent No.: US 12,476,638 B2
(45) Date of Patent: Nov. 18, 2025

(54) FPGA-BASED ADJUSTABLE CLOCK FOR AUDIO DEVICES

(71) Applicant: Shure Acquisition Holdings, Inc., Niles, IL (US)

(72) Inventors: Eugen Warkentin, Elgin, IL (US); Mack Mansouri, Wheeling, IL (US)

(73) Assignee: Shure Acquisition Holdings, Inc., Niles, IL (US)

(*) Notice: Subject to any disclaimer, the term of this patent is extended or adjusted under 35 U.S.C. 154(b) by 144 days.

(21) Appl. No.: 18/243,920

(22) Filed: Sep. 8, 2023

(65) Prior Publication Data

US 2025/0088191 A1    Mar. 13, 2025

(51) Int. Cl.
*H03K 19/17736*   (2020.01)
*G06F 1/06*   (2006.01)

(52) U.S. Cl.
CPC ........... *H03K 19/1774* (2013.01); *G06F 1/06* (2013.01)

(58) Field of Classification Search
CPC .............................. H03K 19/1774; G06F 1/06
USPC .......................................... 327/158, 161–163
See application file for complete search history.

(56) References Cited

U.S. PATENT DOCUMENTS

| | | | |
|---|---|---|---|
| 6,028,463 A | 2/2000 | Albu et al. | |
| 6,043,677 A | 3/2000 | Albu et al. | |
| 6,060,902 A | 5/2000 | Albu et al. | |
| 6,191,613 B1 | 2/2001 | Schultz et al. | |
| 6,297,666 B1 | 10/2001 | Weingartner et al. | |
| 6,549,047 B2 * | 4/2003 | Yamazaki | H03K 5/133 327/158 |
| 7,463,626 B2 | 12/2008 | Roy et al. | |
| 7,876,790 B2 | 1/2011 | Cho et al. | |
| 7,973,565 B2 | 7/2011 | Ishii et al. | |
| 8,478,856 B2 | 7/2013 | Williams et al. | |

(Continued)

FOREIGN PATENT DOCUMENTS

| | | |
|---|---|---|
| CN | 102882623 B | 11/2014 |
| CN | 109254941 B | 4/2020 |

(Continued)

OTHER PUBLICATIONS

Beireigel, S., et al., "Methods for clock signal characterization using FPGA resources," IOP Publishing for Sissa Medialab, published Mar. 17, 2020, 14 pages.

(Continued)

*Primary Examiner* — Menatoallah Youssef
*Assistant Examiner* — Colleen J O Toole
(74) *Attorney, Agent, or Firm* — Banner & Witcoff, Ltd.

(57) ABSTRACT

An adjustable clock that may be implemented on a field-programmable gate array (FPGA). The adjustable clock may be highly accurate and stable, and may be adjustable in response to software commands. The adjustable clock may be configured to generate a clock signal that is synchronized in frequency and/or phase with a clock that is external to the FPGA, such as a Precision Time Protocol (PTP) clock. The FPGA may implement the adjustable clock with a number of elements as programmable logic, including a numerically-controlled frequency divider, a multi-tap delay line, logic configured to dynamically select, for each clock pulse, a delay of the multi-tap delay line, and a feedback loop to control the numerically-controlled frequency divider.

20 Claims, 4 Drawing Sheets

(56) References Cited

U.S. PATENT DOCUMENTS

| | | | |
|---|---|---|---|
| 8,497,704 B2 | 7/2013 | Singh et al. | |
| 8,797,081 B2 | 8/2014 | Schlachter et al. | |
| 8,981,813 B2 | 3/2015 | Chan et al. | |
| 9,116,561 B2 | 8/2015 | Morris et al. | |
| 9,230,046 B2 | 1/2016 | Asaad et al. | |
| 9,405,877 B1 | 8/2016 | Ramabadran et al. | |
| 9,537,491 B1 | 1/2017 | Ganusov et al. | |
| 10,020,905 B2 | 7/2018 | Farra et al. | |
| 10,393,502 B2 | 8/2019 | Johnson et al. | |
| 10,886,919 B1 | 1/2021 | Myers et al. | |
| 11,216,022 B1 | 1/2022 | Liu et al. | |
| 2005/0237093 A1* | 10/2005 | Wilhite | H03L 7/16 327/158 |
| 2007/0043966 A1 | 2/2007 | Chang et al. | |
| 2010/0213978 A1 | 8/2010 | Khatri et al. | |
| 2012/0297232 A1 | 11/2012 | Bircher | |
| 2017/0055235 A1 | 2/2017 | Rabii et al. | |
| 2017/0351796 A1 | 12/2017 | Sikka | |
| 2018/0052203 A1 | 2/2018 | Sikka | |
| 2018/0052204 A1 | 2/2018 | Jiang et al. | |

FOREIGN PATENT DOCUMENTS

| | | |
|---|---|---|
| CN | 111884749 A | 11/2020 |
| CN | 112436825 A | 3/2021 |
| WO | 2022121048 A1 | 6/2022 |

OTHER PUBLICATIONS

"Choose The Optimal Clocking Solution for FPGA-Based Designs," ElectronicDesign®, <<https://www.electronicdesign.com/print/content/21799897>>, May 29, 2014, 5 pages.

\* cited by examiner

FPGA-BASED ADJUSTABLE CLOCK FOR AUDIO DEVICES

BACKGROUND

Clocking is an important aspect of many digital audio systems. An audio device's clock(s) may be used to ensure that audio is captured, encoded, transmitted, received, decoded, recorded, or played at the correct time and at the correct rate. As part of this, it may be desirable for the clock to accurately maintain its frequency and/or its phase to a certain degree. For example, the clock may need to have low jitter, which refers to drift in a clock's signal such that the intervals between clock cycles slightly vary over time. For higher-quality audio, a low-jitter clock may be very desirable. Moreover, when multiple digital audio devices are connected together into a system, the audio devices may need to synchronize their clocks with one another. To maintain synchronization, the audio devices in the system may use a time synchronization protocol to exchange information about their respective clocks, or differences thereof. For example, one of the audio devices may control a clock that is used system-wide (for example, by playing the role of clock "master"), where the rest of audio devices synchronize their internal clocks in real time to the frequency and phase of the clock of the clock master. Such real-time adjustment may involve specialized clock synchronization circuitry, which can involve multiple components that increase device manufacturing costs and power consumption. Moreover, it can be difficult to provide a clock that is both accurately adjustable and that has low jitter.

SUMMARY

The following summary presents a simplified summary of certain features. The summary is not an extensive overview and is not intended to identify key or critical elements.

According to some aspects as described herein, an adjustable clock may be fully implemented on an FPGA, without requiring additional specialized hardware chips and circuits other than the FPGA.

According to further aspects as described herein, the frequency and/or phase may be adjustable of the clock generated by the adjustable clock may be adjusted in real time through software control. To accomplish this, the adjustable clock may include, for example, a numerically-controlled frequency divider, a jitter-reduction circuit that includes a dynamically programmable delay line, an all-digital phase lock loop with a fractional frequency divider, an accurate time stamper unit with nano-second scale resolution, and a software interface that may be used to adjust the phase and/or frequency of a generated clock, such as to synchronize the generated clock with an external clock master that is input to the adjustable clock.

According to further aspects as described herein, the adjustable clock may generate a clock of any arbitrary frequency (within a wide frequency range) and/or phase, and that has low jitter, is stable, is highly-adjustable, and is software-tunable in phase and/or frequency. Such an adjustable clock may be used in digital audio applications to, for example mitigate possible audio data overflows and/or underflows, or as a slave clock that can be synchronized to a local clock and/or to a global master clock such as a global positioning system (GPS) clock or to a Precision Time Protocol (PTP) clock.

These and other features and potential advantages are described in greater detail below.

BRIEF DESCRIPTION OF THE DRAWINGS

Various features are shown by way of example, and not by limitation, in the accompanying drawings. In the drawings, like numerals reference similar elements.

DETAILED DESCRIPTION

The accompanying drawings, which form a part hereof, show examples of the disclosure. It is to be understood that the examples shown in the drawings and/or discussed herein are non-exclusive and that there are other examples of how the disclosure may be practiced.

Figure 1:
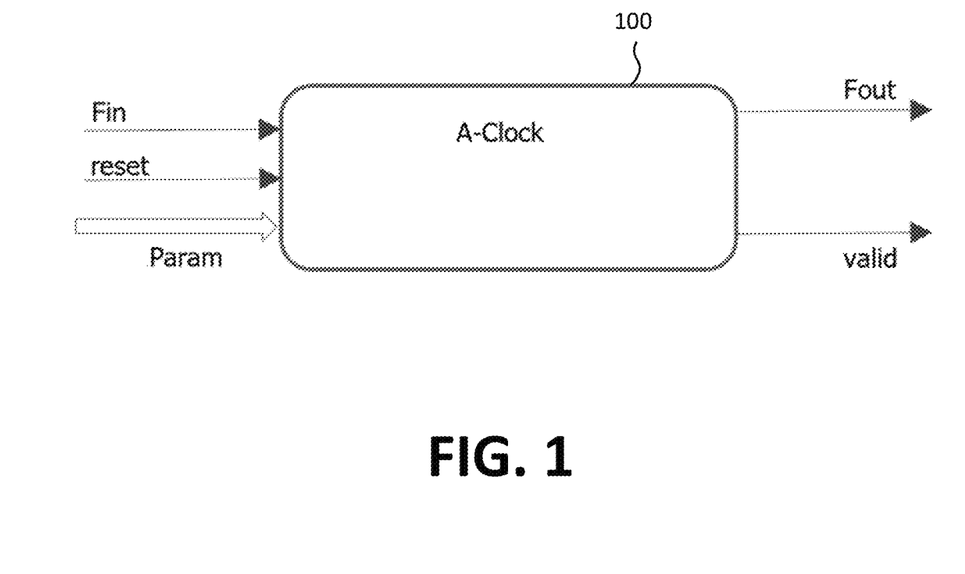
FIG. 1 is a block diagram of an example adjustable clock according to aspects as described herein.

FIG. 1 is a block diagram of an example adjustable clock ("A-Clock") 100. Adjustable clock 100 may be implemented using circuitry, such as being partially or fully implemented with one or more of a field programmable gate array (FPGA), an application-specific integrated circuit (ASIC), another type of integrated circuit, and/or other electronic circuit components. Adjustable clock 100 may have one or more inputs and one or more outputs. In the shown example, adjustable clock 100 has a frequency-in (Fin) input, a reset input, a parameters (param) input, a frequency out (Fout) output, and a valid indication output. The Fin input may receive an input signal such as a reference clock signal. The reset input may receive a signal (e.g., data) indicating a reset of the functionality of the adjustable clock 100. The param input may receive a signal (e.g., data) indicating one or more parameters that affect operation of the adjustable clock 100. The Fout output may output a generated clock signal having a clock frequency that may be different from the clock frequency of the Fin input. The clock signal Fout may be generated based on the signals provided by the Fin, reset, and/or param inputs. The valid output may output a signal (e.g., data) indicating a validity state of the Fout clock.

Figure 2:
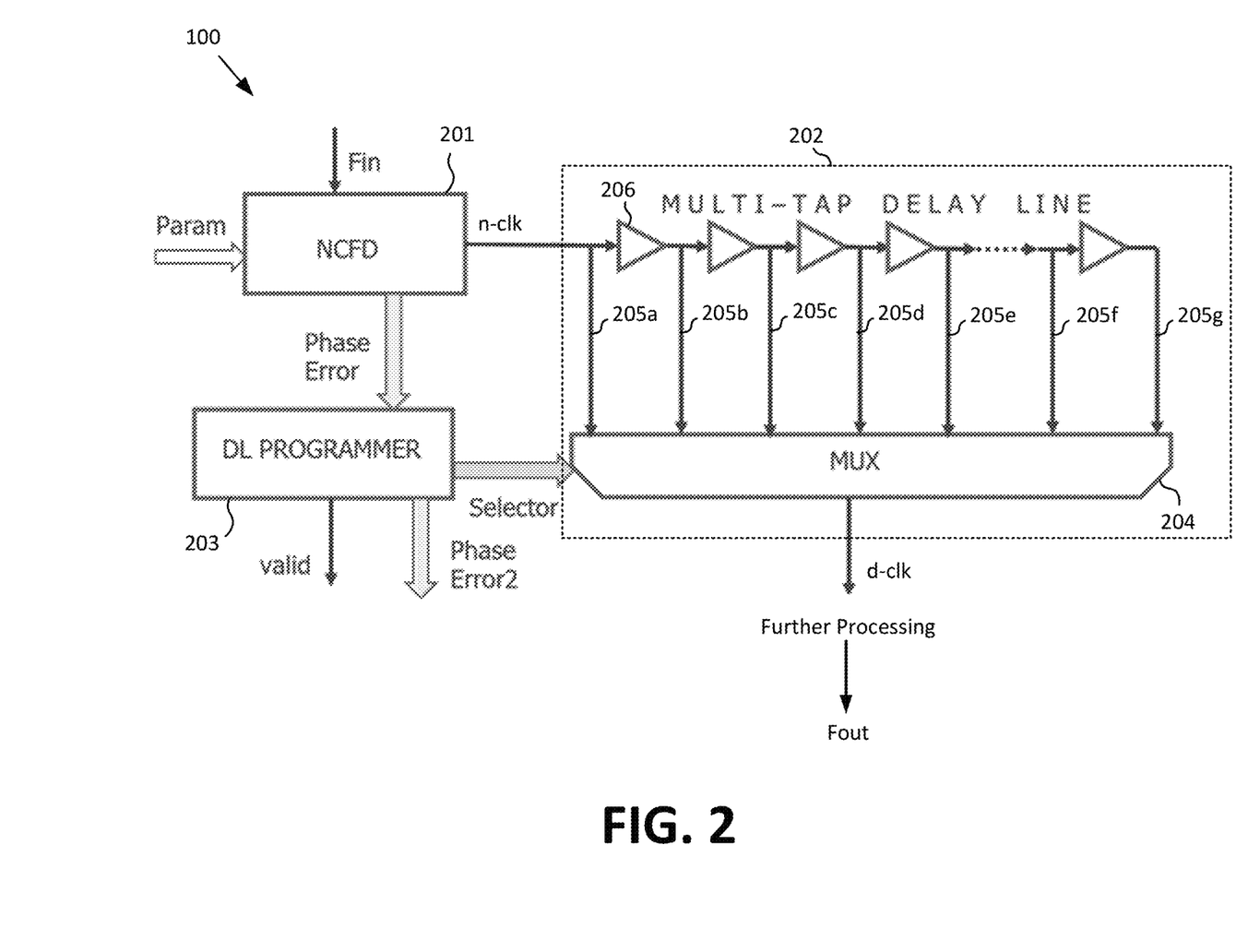
FIG. 2 is a block diagram of an implementation of the adjustable clock of FIG. 1, according to aspects as described herein.

FIG. 2 is a block diagram of an example implementation of the adjustable clock 100. At a high level, the adjustable clock 100 may include a frequency divider referred to herein as a numerically controllable frequency divider (NCFD) 201, a multi-tap delay line 202, and a control block referred to herein as a delay line (DL) programmer 203. The delay line 202 may include a multiplexer (MUX) 204, a plurality of amplifiers such as amplifier 206, and a plurality of taps, or outputs, 205a-205g (collectively, 205). The NCFD 201 may be a modified variation of a numerically-controlled oscillator (NCO) and may generate, based on Fin clock signal and the input parameters at the param input, a divided clock signal n-clk. The signal n-clk may be derived from Fin and have a frequency that is based on the parameters provided via the param input. The NCFD 201 may implement an algorithm that generates n-clk to be any desired frequency, which may be the same as or different from the frequency of Fin. However, may be expected to have jitter.

The jitter may be, for example, on the order of about one input clock (Fin) period. Reducing the clock period of Fin (and thus increasing the frequency of Fin) may not always be feasible, so additional design blocks may be implemented to reduce the jitter of n-clk. For example, the jitter may be reduced to significantly less than one clock period of Fin. As will be described below, such jitter reduction may be accomplished using the multi-tap delay line 202, the DL programmer 203, and the multiplexer 204, as well as phase error indications from the NCFD 201.

The NCFD 201 may be used to generate a divided clock (n-clk) corresponding to one or more characteristics indicated by the input parameters (param), such as a frequency, a frequency adjustment, and/or other characteristics upon which the NCFD 201 may base its frequency division operation. The NCFD 201 may be configured to generate the divided clock n-clk to be of any desired frequency within a wide range of frequencies, where the desired frequency may be indicated by the param input to the NCFD 201. However, the generated clock n-clk may be expected to have a jitter of about one input clock period. Reducing the input clock period of Fin (and thus increasing the frequency of the input clock Fin) is not always possible, so as discussed herein, additional design blocks may be used to reduce the jitter to a fraction of one input clock period of Fin.

The NCFD 201 may also generate a phase error (signal "Phase Error") for each generated pulse of the divided clock n-clk. As will be discussed herein, each generated pulse of the divided clock n-clk may be delayed to compensate for its phase error. Circuitry may be provided as a combination of the multi-tap delay line 202, the multiplexer 204, and the DL programmer 203, which is a block that calculates the delay to be selected in the delay line 202 based on the phase error. The divided clock n-clk may be expected to have a jitter of about one input clock period of Fin, so the delay line 202 may only need to cover the duration of one input clock period of Fin. For every rising edge of the n-clk signal, the NCFD 201 may generate an associated Phase Error signal which indicates how much that rising edge should be delayed. The DL-programmer 203 may program the delay line 202 and its multiplexer 204 to use the most appropriate tap output 205 to delay the rising edge. The DL-programmer 203 may also calculate the phase error (represented by the signal "Phase Error2") for the delay-line output signal d-clk. The delay-line 202 may have a fixed resolution, and so the resulting output signal d-clk may still have some phase error (represented by Phrase Error2), as calculated by the DL-programmer 203. Depending on the application, signal Phase Error2 may be not generated (or may be generated but ignored). As a further example, the d-clk and the Phase Error2 signals may be provided to a second stage delay-line (and its associated DL programmer) with a finer resolution, as described below. All references herein to rising edges may be replaced with references to falling edges.

In operation, the NCFD 201 may determine and generate an indication of a phase error for each generated pulse of n-clk. Thus, while the NCFD 201 is generating n-clk, the NCFD 201 may also generate an indication of the phase error for each pulse of n-clk in real time. Such phase errors together form the jitter of n-clk. The indications of the phase errors may be received by the DL programmer 203, which may determine, based on each indicated phase error, a delay for the associated pulse of n-clk. The determined delay may be determined to at least partially (and potentially optimally) compensate for the respective indicated phase error. The DL programmer 203 may determine the delay by calculating the delay based on the phase error indication, by looking up the delay in a look-up table that associates each of a plurality of phase error values (or each of a plurality of ranges of phase error values) with a particular amount of delay. Where the spacings of the delays between taps are equal, the delay may be calculated using the calculations indicated in Eqs. 6-12 as shown below. By determining the delay, the DL programmer 203 may determine an explicit value of the delay, or the DL programmer 203 may determine a proxy indication of the determined delay, such as a particular selector value for the multiplexor 204. In either case, and for each indicated phase error, the determination of the delay may involve in the DL programmer 203 determining a particular selector signal associated with the indicated phase error. The selector signal may be, for example, a single-bit or multi-bit data signal. For example, where the delay line 202 has N taps 205, the selector signal may be a digital signal having at least $\log_2 N$ bits, so that each of the taps 205 is associated with a unique value of the selector signal.

Each of the taps 205 may be associated with a different amount of delay generated by the delay line 202, and may each be considered a different stage of the delay line 202. For example, tap 205a may be delayed from the input at n-clk by a first amount of delay, tap 205b may be delayed by a further amount of delay that is cumulative to the amount of delay experienced at tap 205a, tap 205c may be delayed by a still further amount of delay that is cumulative to the amount of delay experienced at tap 205b, etc. The delay line 202 may comprise a plurality of amplifiers, such as an amplifier 206, connected in series. Each of the taps 205 may be an output of one of the amplifiers. While seven tap 205 (each output by a respective series-connected amplifier) are depicted in FIG. 2, the delay-line may have any number of taps 205 each being output from a respective series-connected amplifier.

The DL programmer 203 may send the selector signal to the multiplexor 204. The multiplexor 204 may select a particular tap 205, associated with the received selector signal, corresponding to the determined delay. For example, a first delay value may be associated with a first value of the selector signal sent by the DL programmer 203, and the first value of the selector signal may cause the multiplexor 204 to output (as a signal referred to as d-clk) a first tap of the delay line 202, such as tap 205a (or any other tap 205). And, a different second delay value may be associated with a different second value of the selector signal sent by the DL programmer 203, and the second value of the selector signal may cause the multiplexor 204 to output (as d-clk) a different second tap of the delay line 202, such as tap 205b (or any other tap 205). Thus, d-clk may be a delayed version of n-clk, where the delay is selected based on the selector signal.

Because n-clk may be expected to have a jitter of about one input clock period, the delay line 202 may only need to have a maximum delay equal to at least the maximum jitter, i.e., about the duration of one clock period T of Fin. Thus, for example, the delay of the highest-delayed tap 205 may be substantially equal to one clock period of Fin. However, the delay of the highest-delayed tap 205 may have a greater delay. The various amplifiers may be configured such that the taps 205 provide delays equally subdividing the greatest delay. For example, if the greatest delay tap (e.g., tap 205g) is equal to one clock period T, and there are N total taps, then each tap may provide an additional delay of T/N. For example, where there are seven taps, then tap 205a may provide a delay of T/7, the next tap 205b in series may provide a delay of 2T/7, the next tap 205c in series may provide a delay of 3T/7, etc. Thus, the spacing between the delays may be equal. However, it is also possible to make the various delays unequal to one another, if desired.

As will be discussed further below, d-clk may be further processed, such as by feeding d-clk into a phase-locked loop (PLL), to produce the Fout signal that is an output of the adjustable clock 100.

The theory of how the NCFD 201 works may be as follows. Two unsigned parameters may be used, a and b, with b>a. On each input clock Fin cycle (e.g. at each rising edge, or alternatively, each falling edge, of Fin):

```
if (accumulator > b - a)
    accumulator = a - (b - accumulator)
    generate a pulse of the output clock
else
    accumulator = accumulator + a
endif
```

The above algorithm may generate a waveform with an average frequency of $$F_{out} = F_{in} \frac{a}{b}, \quad \text{(Eq. 1)}$$

where $F_{out}$ is the average overflow rate, when the phase accumulator value is greater than b. If instead of generating a pulse, the output is toggled, the NCFD 201 may generate a rectangular signal with a duty cycle close to 50%, with a frequency of $$F_{out} = F_{in} \frac{a}{2b} \quad \text{(Eq. 2)}$$

The frequency resolution of the system (which is the smallest possible incremental change in frequency), may be given by $$\Delta F = F_{in}/b \quad \text{(Eq. 3)}$$

The output pulses may be generated on every input clock pulse, so output pulse edges may be aligned to the input clock edges (e.g., rising edges or falling edges). Therefore, the length L of the output pulses may not be equal to the true period $T_{out}$ of a frequency $F_{out}$ signal, and may rather jump between the following values:

$$T_{in} \cdot \lfloor b/a \rfloor \leq L \leq T_{in} \cdot \lfloor (b+a-1)/a \rfloor \quad \text{(Eq. 4)}$$

$$T_{out} = (T_{in} \cdot b)/a \quad \text{(Eq. 5)}$$

Except on frequencies that are a divisor of the input clock frequency $F_{in}$, the generated waveform may be expected to have a jitter of about one input clock period. Moreover, the generated clock may become more and more irregular as the frequency gets closer to $F_{in}/2$. On the other hand, when the input frequency is heavily divided, such that the output clock duration is between $T_{in} \cdot N$ and $T_{in} \cdot (N+1)$, the output jitter may be reduced by the factor of 1/N.

The NCFD 201 may generate an output pulse when the value in accumulator is greater than the value of b−a. Therefore in general, the pulse may be generated slightly earlier than it should with the phase error of b−accumulator. If a single stage of the delay chain has the delay of δ, then in order to compensate for the pulse phase error, one would select the delay tap number S, of the delay line 202, as follows:

$$Sscaled = \frac{T_{in}}{\delta} \cdot \frac{(b - \text{accumulator})}{a} \quad \text{(Eq. 6)}$$

$$S = \lfloor Sscaled \rfloor \quad \text{(Eq. 7)}$$

$$SErr2 = Sscaled - S. \quad \text{(Eq. 8)}$$

This calculation may be performed in real time for every input clock pulse to decide what the required delay is for each corresponding output clock pulse. There are several steps that may be performed to simplify this calculation. First, the NCFD algorithm may be rewritten in terms of remaining phase, r=b−accumulator. Two unsigned parameters are used, a and b, with b>a.

r=b;

on each input clock Fin cycle (e.g. at each rising edge, or alternatively at each falling edge):

```
if (r < a)
    r = b - (a - r)
    generate a pulse of the output clock
else
    r = r - a
endif
```

The formula for the delay tap number becomes $$S = \left\lfloor N_{\text{MAX}} \cdot \frac{r}{a} \right\rfloor \quad \text{(Eq. 9)}$$

where $N_{MAX}=T_{in}/\delta$ is the number of stages in the delay chain required to cover the duration of one input clock period $T_{in}$. In a typical scenario of master-slave clock synchronization, the parameter b may be fixed (for example, b is equal to $2^{32}$), and parameter a may be allowed to vary slightly around a midpoint value of $a_0$ $$a = a_0 \cdot (1 + \alpha), \alpha \ll 1$$

The calculations are simple if we can choose $a_0$ as $N_{MAX}$ times a power of two, $$a_0 = N_{MAX} \cdot 2^A \quad \text{(Eq. 10)}$$

$$S = \left\lfloor N_{MAX} \cdot \frac{r}{N_{MAX} \cdot 2^A} \cdot (1 - \alpha) \right\rfloor \approx \lfloor r/2^A \rfloor \quad \text{(Eq. 11)}$$

Another approach is to make parameter a fixed (for example to, to set $a=N_{MAX} \cdot 2^A$) and make parameter b variable, then again, $$S = \lfloor r/2^A \rfloor \quad \text{(Eq. 12)}$$

Since the delay line 202 may need to provide fractional delays (in terms of the input clock Fin), it may not be desirable to implement the delay line 202 as sequential circuit. Rather, it may be desirable to implement the delay line 202 using a combinatorial circuit.

Cascaded delay lines may also be used. For example, the delay line programmer 203 may calculate a secondary phase error SErr2 (see Eq. 8, above), which is a phase error on the output of the delay line 202. Therefore, it is possible to add a second stage of delay adjustment circuit, cascaded after the delay line 202. The second delay line stage may need only cover the total delay duration equal to the resolution of the first delay line 202, in other words a total delay duration equal to the delay of a single delay tap of the first delay line 202. Differential delay lines may also be used. For example, given two delay lines that delay, respectively, with resolutions $\delta1$ and $\delta2$, ($\delta1 > \delta2$), it may be desirable to combine the two delay lines to operate as a single delay line with an effective resolution of $\delta = \delta1 - \delta2$. In such an example, the first delay line 202 may provide a positive delay and the second delay line may effectively provide a negative delay. The first delay line may be programmed according to Eq. 7 (above) for selecting tap S1, and the second line may use tap number $N_{MAX} - S1$, where $N_{MAX}$ is described above with respect to Eq. 9.

Figure 3:
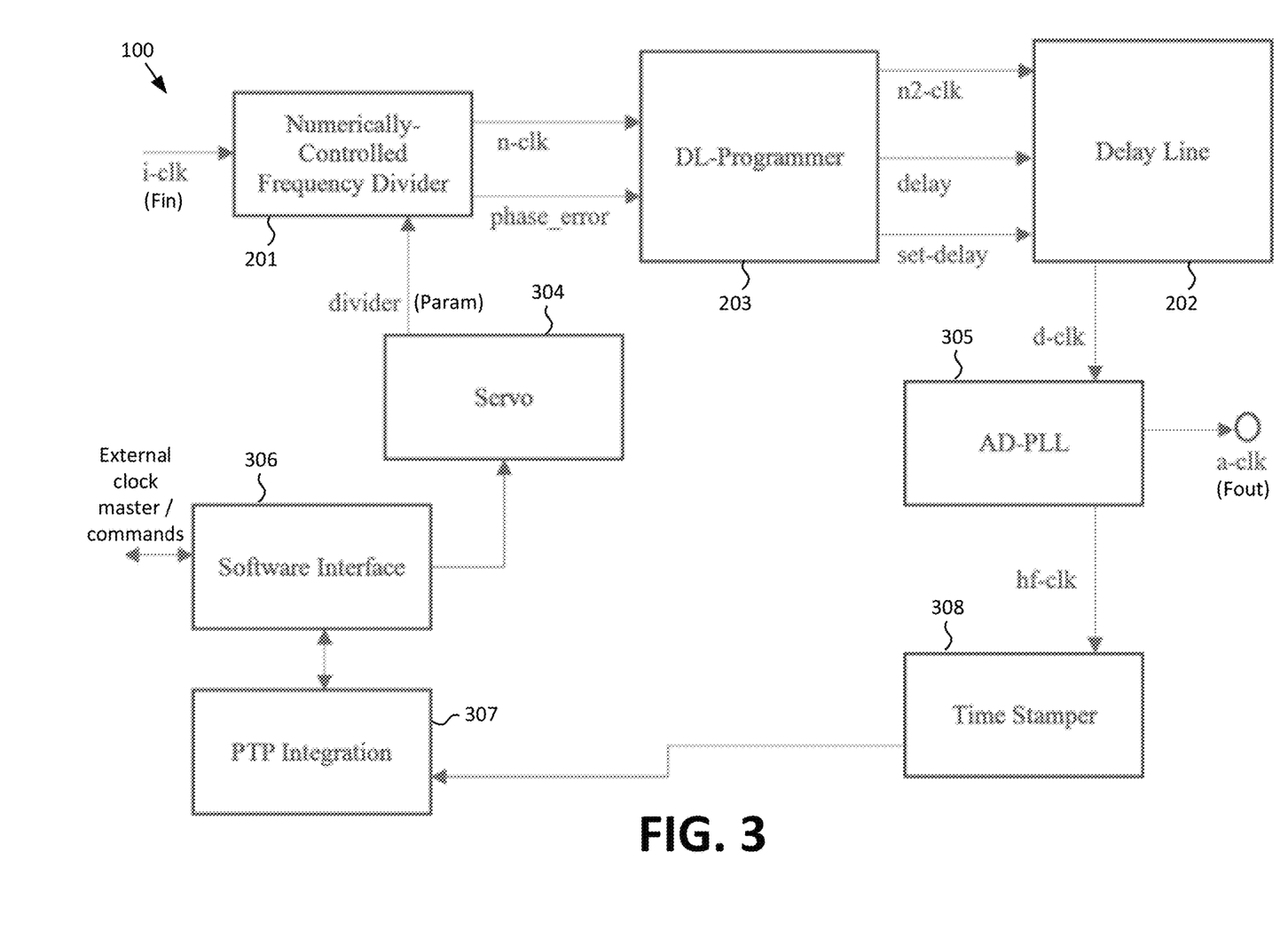
FIG. 3 is a block diagram of an example further detailed implementation of the adjustable clock of FIGS. 1 and 2, according to aspects as described herein.

FIG. 3 is a block diagram of a further detailed implementation of the adjustable clock 100 described above with respect to FIGS. 1 and 2. As shown in FIG. 3, the adjustable clock 100 may include the above-discussed NCFD 201, DL programmer 203, and multi-tap delay line 202. The adjustable clock 100 may further include a servo 304 providing a "divider" signal (also referred to in FIGS. 1 and 2 as the "param" signal) to the NCFD 201. The adjustable clock 100 may further include an analog-to-digital phase-locked loop (AD-PLL) 305 that receives d-clk and that generates an a-clk signal and an hf-clk signal based on d-clk. In FIG. 3, a-clk may be the same signal as Fout. The adjustable clock 100 may further include a software interface 306 that provides output to the servo 304, wherein the servo 304 may generate the divider (param) signal based on the output received from the software interface 306. The param signal from the servo 304 may fed back to the NCFD 201. The adjustable clock 100 may further include a Precision Time Protocol (PTP) integration module 307 that provides output to the software interface 306, wherein the output of the software interface 306 may be based on the output received from the PTP integration module 307. The adjustable clock 100 may further include a time stamper 308 that provides output to the PTP integration module 307 and that may have nano-second scale resolution, wherein the output of the PTP integration module 307 is based on the output received from the time stamper 308. Moreover, the output of the timer stamper 308 may be based on hf-clk.

The software interface 306 may be used to adjust the phase and/or frequency of the generated clock a-clk (Fout). The software interface 306, as part of a feedback loop that may also include the time stamper 308, the PTP integration module 307, and the servo 304, may also allow for the synchronization of a-clk to an external clock master. For example, it may be desirable to synchronize the frequency and/or phase of a-clk with the frequency and/or phrase of an external clock master. The external clock master, or commands that are generated based on the external clock master, any be inputted to the software interface 306. The software interface 306 may control the servo 304 to control the NCFD 201 to divide the i-clk (Fin) by an appropriate amount so that the frequency of n-clk is equal to (or very close to, or at least based on) the frequency of the external clock master. In turn, once d-clk is generated by the delay line 202, the AD-PLL 305 may generate a high-frequency clock as hf-clk that may have a frequency that is directly proportional to the frequency of d-clk, and, therefore, also directly proportional to a-clk. The frequency of hf-clk may be higher than (e.g., a multiple of) the frequency of d-clk, in order to allow the time stamper 308 to operate with a short time resolution. The time stamper 308 may send a time-stamped signal, based on the timing of hf-clk, to the PTP integration module 307. The time stamper 308 may be implemented as, for example, a very long counter (for example, 64 bits in length) that counts intervals of time such as nano-seconds and seconds. The counter may be incremented by a desired amount on every rising (or falling) edge of hf-clk. For example, if the frequency of hf-clk is chosen to be 200 MHz, then on each hf-clk pulse, the counter of the time stamper 308 may be incremented by 5. In such an example, the resolution of the time-stamper 308 would be 5 ns. With the help of PTP integration module 307, the value stored in the counter of the time-stamper 308 may be made available to the network interface used to exchange PTP messages with PTP master. This means that all sent and received PTP messages may be locally time-stamped with the values in the counter of the time-stamper 308. PTP software may compare the local time stamps with the time stamps of the PTP master received via PTP messages, estimate the PTP clock offset and PTP clock delay, and calculate appropriate data to control the servo module 304 to adjust the frequency of signal a-clk. Because the frequency of signal hf-clk may be directly proportional to the a-clk frequency, the PTP software may thereby also control and adjust the rate of counting of the time-stamper module 308.

Figure 4:
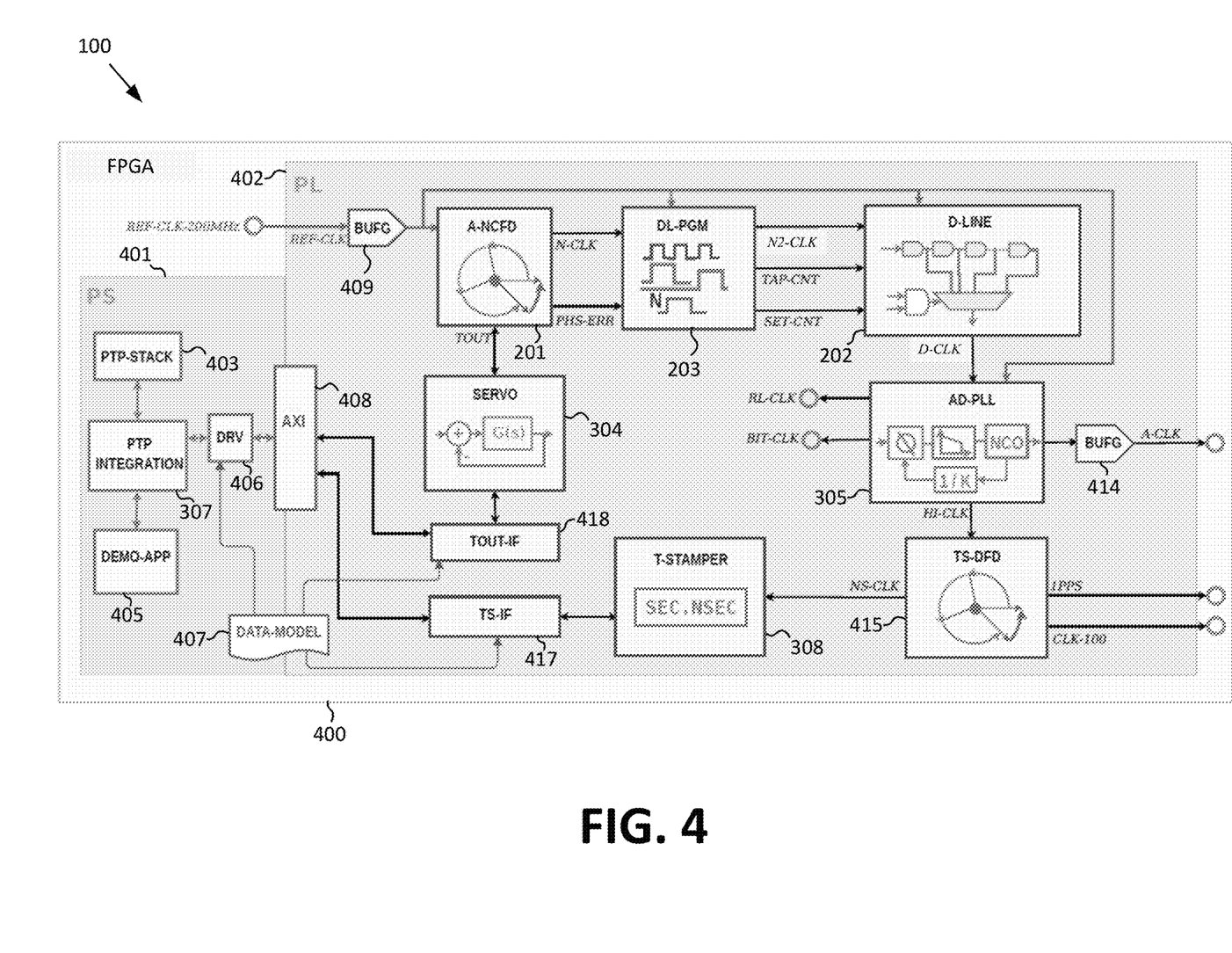
FIG. 4 is a block diagram of another example further detailed implementation of the adjustable clock of FIGS. 1-3, according to aspects as described herein.

FIG. 4 is a block diagram of an example implementation of the adjustable clock 100 of FIGS. 1, 2, and 3 on a field programmable gate array (FPGA) 400. In further examples, the adjustable clock 100 may be implemented on an application-specific integrated circuit (ASIC), another type of integrated circuit such as another type of system-on-chip (SoC), and/or using other electronic circuit components.

The FPGA 400 may include a processing subsystem (PS) 401 and programmable logic (PL) 402. The PS 401 may include a PTP-stack 403, the PTP integration module 307, a Demo-App 405, a DRV 406, and a data-model 407. The PS 401 may interface with the PL 402 via an Advanced extensible Interface (AXI) 408. The PL 402 may also include the data-model 407, a clock buffer (BUFG) 409 configured to receive the signal REF-CLK (which may be the same as i-clk), the NCFD 201, which may be an asynchronous NCFD (A-NCFD), the DL programmer (DL-PGM) 203, the multi-tap delay line (D-LINE) 202, the AD-PLL 305, a time-stamper digital frequency divider (TS-DFD) 415, the time stamper 308, a time stamper interface (TS-IF) 417, a time-stamper control output (TOUT-IF) 418, and the servo 304. The TS-IF 417 and the TOUT-IF 418 may together be implemented as part of the software interface 306.

Where the adjustable clock 100 is implemented on an FPGA, such as the FPGA 400, the FPGA vendor may provide a multi-tap delay line or a delay line plus multiplexor combination as a primitive. However, there may be limitations to such a primitive, such as the number of taps and/or the working frequency of the primitive. Modern FPGAs typically provide high-speed chain structures designed for general-purpose applications. A few well-known examples are carry chains, cascade chains, sum-of-products chains, DSP-chains, etc. These chain structures provide short predefined routes between identical logic elements, and they are ideal for implementation of the delay line 202. For example, Xilinx 7 Series provides configurable logic blocks (CLB) as the main logic resources for implementing sequential as well as combinatorial circuits. Each CLB element contains a pair of slices each of which has an independent carry chain-a dedicated high-speed carry logic for arithmetic functions. The CLBs are arranged in columns, so the carry chain in a slice is naturally wired to the carry chains in the next and previous slices. Thus, a longer carry chain may be constructed to implement the delay line 202, with guaranteed predefined short routes between identical elements.

The adjustable clock 100 shown in FIG. 4 may generally operate as follows. Within the PS 401, the DRV 406 may be a system driver that communicates with both the time stamper 308 and the servo 304 blocks over an AXI bus 408. The DRV 406 may do this by reading from and writing to a set of registers implemented by TS-IF 417 and TOUT-IF 418 modules. The values of the TOUT-IF 418 registers may be used to control the operation of the servo 304, and the values of registers read from the TS-IF 417 may indicate a snapshot of the current time stored by the time stamper 308. The DRV 406 may allow the "hardware" on the PL 402 side to be accessible to the rest of the software as a standard system clock (e.g., a POSIX clock) with adjustable frequency and settable time. The DRV 406 may also allow both the PL 402 and PS 401 sides to have access to and use the same set of configuration parameters provided by DATA-MODEL 407. The PTP-INTEGRATION module 307 may instruct the PTP-STACK 401 to use the clock exposed by the DRV 406 as a local PTP clock.

Within the PL 402, a reference clock REF-CLK, which may be the same as the i-clk signal or the Fin signal in FIG. 3, may be provided to the BUFG 409. The reference clock REF-CLK may have any desired frequency, such as about 200 MHz, or any frequency below or above 200 MHZ. Generally, it may be expected that the reference clock REF-CLK has a fixed frequency, however it is not necessary for the frequency of the reference clock to be highly precise. For example, the reference clock REF-CLK may be generated using an inexpensive piezoelectric resonator such as a crystal oscillator clock. In other examples, the reference clock may be generated using (e.g., derived from) an on-board clock of the FPGA 400. The reference clock REF-CLK is provided to the NCFD 201, which may, as discussed previously divide the reference clock by an amount based on the TOUT signal from the servo 304. The divided reference clock, n-clk (also referred to as capitalized N-CLK), may be provided to the DL programmer 203, along with a phase error signal (labeled as "phase_error" in FIG. 3 and as "PHS-ERR" in FIG. 4). The DL programmer 203 may, as discussed previously, output the previously-discussed n2-clk signal (also referred to as capitalized N2-CLK) and generate one or more signals for selecting a tap of the delay line 202. For example, a TAP-CNT signal may correspond to the selector signal of FIG. 2. A SET-CNT signal may indicate (e.g., when set high) that the TAP-CNT signal is valid, thus triggering D-LINE 202 reprogramming.

The delay line 202 sends, based on the one or more signals received from the DL programmer 203, the delayed signal d-clk (also referred to as the capitalized D-CLK) to the AD-PLL 305. The AD-PLL 305 generates, based on d-clk, a plurality of clocks, for example RL-CLK, BIT-CLK, HI-CLK, and A-CLK. These clocks may be derived from d-clk received from the delay line 202, and may be of the same or different frequencies from d-clk. The A-CLK may have the same frequency (and may be the same signal) as the d-clk received from the delay line 202. The cleaned-up A-CLK may be output from the FPGA via the BUFG 414. The RL-CLK and BIT-CLK may be used for other purposes internal to the FPGA 400. For example, the RL-CLK (a.k.a. LR-clock or Frame clock) and BIT-CLK may be used to handle digital audio signal (e.g., PCM audio, I2S, TDM, etc.). The BIT-CLK may be used to operate on audio data bit-by-bit, and each pulse of the RL-CLK may indicate the start of a new audio frame. The desired frequency for the BIT-CLK may be directly proportional to the audio sample rate, number of audio channels within a frame, and/or the bit-width of each channel. For example, TDM audio with eight 32-bit channels operating at 48 kHz sample rate may utilize a 12.288 MHz BIT-CLK. And the RL-CLK in such an example would be 48 kHz. Suppose, for example, a system is designed to be capable of handling up to 16 32-bit channels at 48 kHz sample rate. Then the a-clk may be set to the maximum BIT-CLK required for this system, 24.576 MHz. When an application in such a system needs to use only two channels, then the BIT-CLK frequency may be set to ⅛ of the A-CLK frequency. Therefore, in general, the A-CLK may have a frequency that is the highest frequency BIT-CLK required by the particular system design. The BIT-CLK frequency may be re-configured during system operation an may equal the A-CLK frequency divided by a power of 2 (i.e., divided by 1, 2, 4, 8, . . . ). The RL-CLK and BIT-CLK may be the primary outputs of the ADD-PLL 305 and may be provided to one or more other modules that handle digital audio.

The HI-CLK (which may be the same clock as hf-clk in FIG. 3) may be of a much higher frequency than the d-clk received from the delay line 202. The HI-CLK signal may drive the time stamper 308 counter, which may represent the current time with very accurate (e.g., at least nanosecond) resolution. Thus, the HI-CLK frequency may be very high, such as about 1 GHz or higher, although the frequency of HI-CLK may be lower, such as about 200 MHz. In this case, the counter of the time stamper 308 may be incremented by 5 (for example) on every HI-CLK pulse, and the effective time stamper 308 resolution in such an example may be approximately 5 ns (which is more than enough for typical audio applications such as AES67). In general, the time-counting resolution of time stamper 308 may be about 5 ns, or of a time-counting resolution in the range of about 1 ns to about 10 ns, or a time-counting resolution of 5 ns or better (e.g., 5 ns or less).

The Digital frequency divider TS-DFD 415 may be used to overcome limitations of the AD-PLL 305 and generate an optimal frequency HI-CLK for the time stamper 308. In addition, the TS-DFD 415 may generate auxiliary 1PPS (1 Hz) and/or CLK-100 (100 Hz) signals for measurements and testing. The time stamper 308 may contain, for example, a nanoseconds-counter (32 bits) and a seconds-counter (32 bits). The values in these counters may represent the current local time with, e.g., nano-second resolution. On receiving a HI-CLK pulse, the nanoseconds-counter may be incremented by the HI-CLK period (in nanoseconds). When the nanoseconds-counter value reaches or exceeds a particular value, such as the value of (10 to the power of 9) nanoseconds, that value may be subtracted from the nanoseconds-counter, and 1 may be added to the seconds-counter. The values of seconds and nanoseconds counters may be made available to the PS 402 side as a pair of 32-bit registers implemented in the TS-IF 417 module and accessible via the AXI 408 bus.

Thus, examples of an adjustable clock have been described that may be implemented on, for example, an FPGA. In some cases, the adjustable clock may be implemented completely on the FPGA, without requiring additional specialized hardware chips and circuits other than the FPGA. The adjustable clock frequency and/or phase may be adjustable in real time through software control. The adjustable clock may include a numerically-controlled frequency divider, a jitter-reduction circuit that includes a dynamically programmable delay line, an all-digital phase lock loop with a fractional frequency divider, an accurate time stamper unit with nano-second resolution, and a software interface that may be used to adjust the phase and/or frequency of a generated clock, such as to synchronize the generated clock with an external clock master that is input to the adjustable clock. Such a low-jitter, stable, highly-adjustable, and software phase/frequency tunable clock may be useful in a wide range of scenarios. For example, such an adjustable clock may be used in digital audio applications to mitigate possible audio data overflows and/or underflows, or as a slave clock that can be synchronized to a local clock and/or to a global master clock such as a global positioning system (GPS) clock or to a Precision Time Protocol (PTP) clock. Moreover, such an adjustable clock may be implemented using all-digital circuitry, such as by being instantiated in a low-cost FPGA. And, the frequency of the generated clock may be seamlessly adjustable over a wide range of frequencies, while maintaining a low-jitter and stable generated clock signal despite it being fully implemented on an FPGA.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. An adjustable clock comprising:
    a field-programmable gate array (FPGA) comprising:
        a numerically-controlled frequency divider configured to:
            receive, for each of a plurality of pulses of a reference clock signal, a feedback parameter; and
            for each of the plurality of pulses of the reference clock signal, generate, based on the respective feedback parameter, a pulse of a divided clock signal and an indication of a phase error for the pulse of the divided clock signal;
        a multi-tap delay line configured to impart a selectable amount of delay on the divided clock signal;
        logic configured to select, for each pulse of the divided clock signal and based on the respective indication of the phase error, the selectable amount of delay of the multi-tap delay line; and
        a feedback loop configured to generate, based on an output of the multi-tap delay line and for each of the plurality of pulses of the reference clock signal, the feedback parameter,
    wherein the FPGA is configured to output an adjustable clock signal based on the output of the multi-tap delay line.

2. The adjustable clock of claim 1, further comprising a crystal oscillator connected to the FPGA and configured to generate a reference clock, wherein the reference clock signal is based on the reference clock.

3. The adjustable clock of claim 1, wherein the FPGA further comprises a software interface configured to receive a signal that is based on a master clock that is external to the FPGA, and wherein the feedback loop is configured to generate each feedback parameter further based on the signal that is based on the master clock.

4. The adjustable clock of claim 3, wherein the feedback loop comprises a servo configured to generate each feedback parameter based on an output of the software interface.

5. The adjustable clock of claim 1, wherein one or more of the numerically-controlled frequency divider, the multi-tap delay line, or the logic configured to select the selectable amount of delay, are implemented as programmable logic of the FPGA.

6. The adjustable clock of claim 1, wherein the feedback parameter indicates a frequency.

7. The adjustable clock of claim 1, wherein the FPGA further comprises a phase-locked-loop configured to generate a plurality of clock signals based on the output of the multi-tap delay line, wherein each of the plurality of clock signals has a different frequency.

8. The adjustable clock of claim 1, wherein the FPGA further comprises a Precision Time Protocol (PTP) integration module, and wherein the feedback loop is further configured to provide, to the PTP integration module, an indication of a current time with a resolution of 5 ns or less.

9. A field-programmable gate array (FPGA) comprising:
    a processing subsystem (PS) configured to communicate, via Precision Time Protocol (PTP), with a device external to the FPGA; and
    programmable logic (PL) comprising:
        a numerically-controlled frequency divider configured to:
            receive, for a plurality of pulses of a reference clock signal, a plurality of feedback parameters; and
            for each of the plurality of pulses of the reference clock signal, generate, based on a respective feedback parameter of the plurality of feedback parameters, a pulse of a divided clock signal and an indication of a phase error for the pulse of the divided clock signal;
        a multi-tap delay line configured to impart a selectable amount of delay on the divided clock signal;
        first programmable logic configured to select, for each pulse of the divided clock signal and based on the respective indication of the phase error, the selectable amount of delay of the multi-tap delay line;
        a phase-locked loop configured to generate, based on an output of the multi-tap delay line, a first clock and a second clock, wherein the first clock has a frequency of at least 1 GHz, and wherein the second clock has a lower frequency than the first clock and is configured to be output by the FPGA;
        second programmable logic configured to generate, based on the first clock, a plurality of time indications; and
        a servo configured to generate, based on the plurality of time indications and based on information from the PS, the plurality of feedback parameters.

10. The FPGA of claim 9, wherein the reference clock signal is based on an output of a crystal oscillator.

11. The FPGA of claim 9, wherein the PS is configured to receive a signal that is based on a master clock that is external to the FPGA, and wherein the information from the PS is based on the master clock.

12. The FPGA of claim 9, wherein the feedback parameters indicate frequencies.

13. A method performed by a field-programmable gate array (FPGA), the method comprising:
- receive, for a plurality of pulses of a reference clock signal, a plurality of feedback parameters;
- for each of the plurality of pulses of the reference clock signal, generating, based on a respective feedback parameter of the plurality of feedback parameters, a pulse of a divided clock signal and an indication of a phase error for the pulse of the divided clock signal;
- determine, for each pulse of the divided clock signal and based on a respective indication of the phase error, a selectable amount of delay;
- delay each pulse of the divided clock signal by the respective selectable amount of delay, to generate a plurality of delayed pulses;
- generate, based on the plurality of delayed pulses, the plurality of feedback parameters; and
- output, based on the plurality of delayed pulses, an adjustable clock signal.

14. The method of claim 13, further comprising generating the reference clock signal based on an output of a crystal oscillator.

15. The method of claim 13, further comprising receiving, via Precision Time Protocol (PTP), a signal that is based on a master clock that is external to the FPGA, wherein the generating the feedback parameters is further based on the signal that is based on the master clock.

16. The method of claim 13, wherein the generating the pulses of the divided clock signal and the indications of the phase error are performed using programmable logic of the FPGA.

17. The method of claim 13, wherein the feedback parameters indicate frequencies.

18. The method of claim 13, wherein the FPGA comprises a phase-locked-loop, the method further comprising using the phase-locked loop to generate a plurality of clock signals based on the plurality of delayed pulses, wherein each of the plurality of clock signals has a different frequency.

19. The method of claim 13, further comprising generating indications of a current time with a resolution of 5 ns or less, wherein the feedback parameters are based on the indications of the current time.

20. The method of claim 13, further comprising receiving, using a processing subsystem (PS) of the FPGA, Precision Time Protocol (PTP) signals from a source external to the FPGA, wherein the generating the feedback parameters is further based on an output of the PS.

* * * * *